Feb. 26, 1929.

V. B. LOWDER 1,703,774

NAPPING MACHINE STOP

Original Filed April 18, 1925    7 Sheets-Sheet 1

Vander B. Lowder
INVENTOR

BY Victor J. Evans
ATTORNEY

WITNESS:

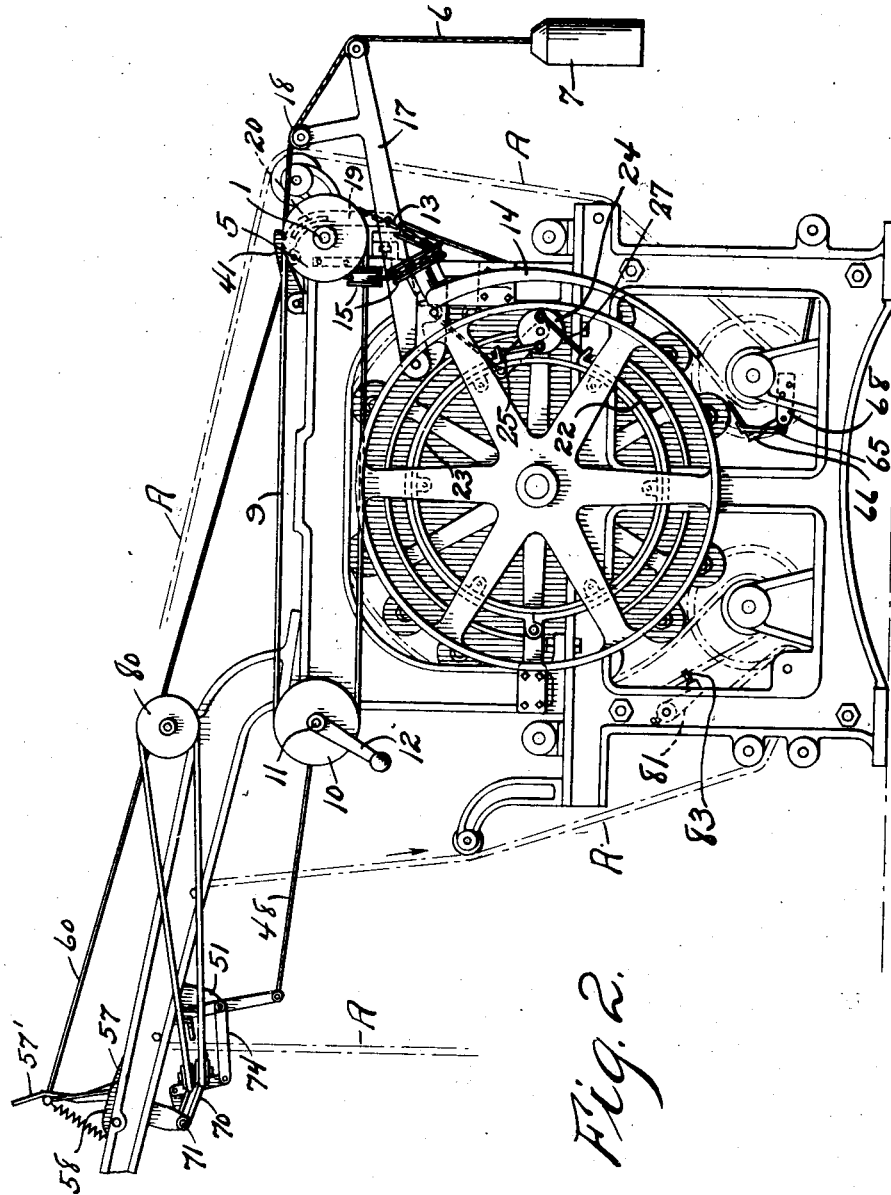

Feb. 26, 1929.  
V. B. LOWDER  
1,703,774  
NAPPING MACHINE STOP  
Original Filed April 18, 1925  7 Sheets-Sheet 3
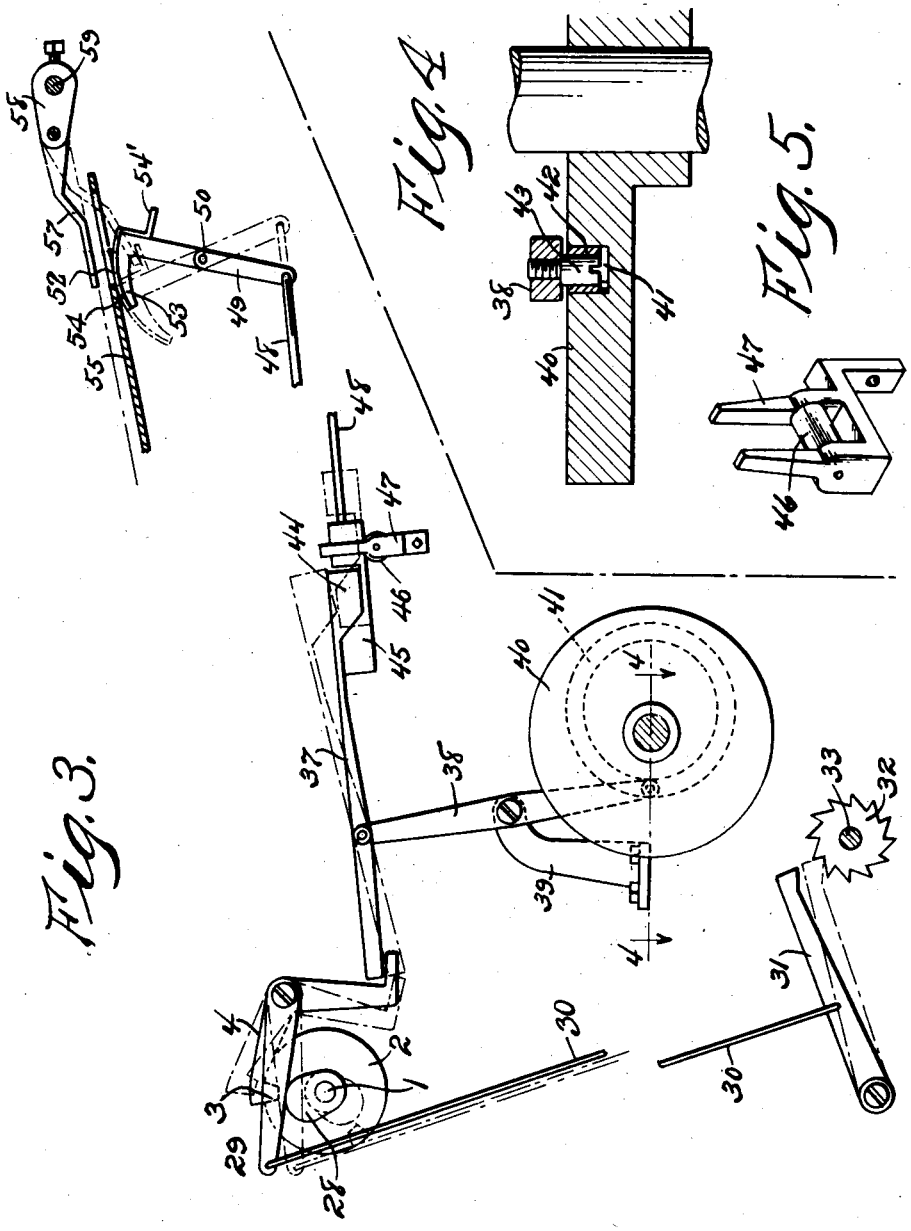
Vander B. Lowder  
INVENTOR Feb. 26, 1929.
V. B. LOWDER
1,703,774
NAPPING MACHINE STOP
Original Filed April 18, 1925    7 Sheets-Sheet 4
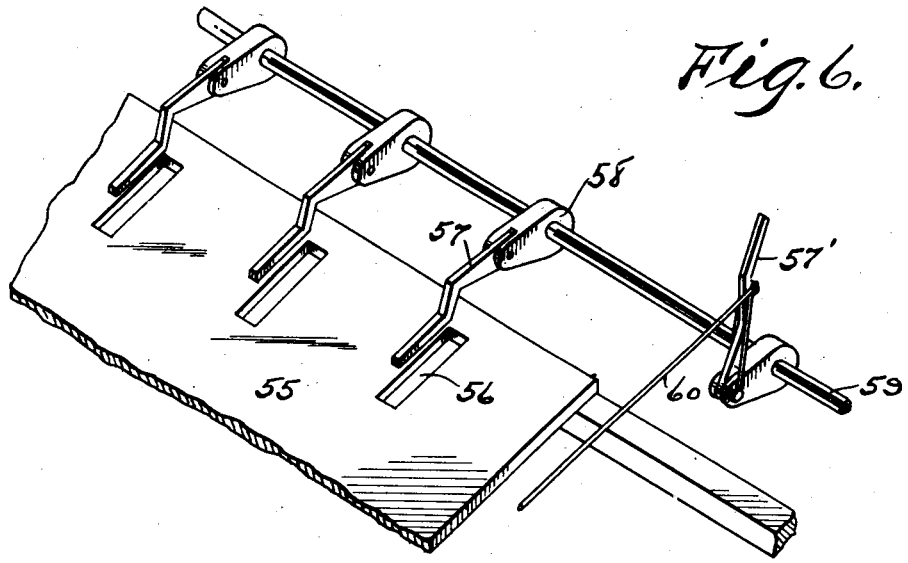
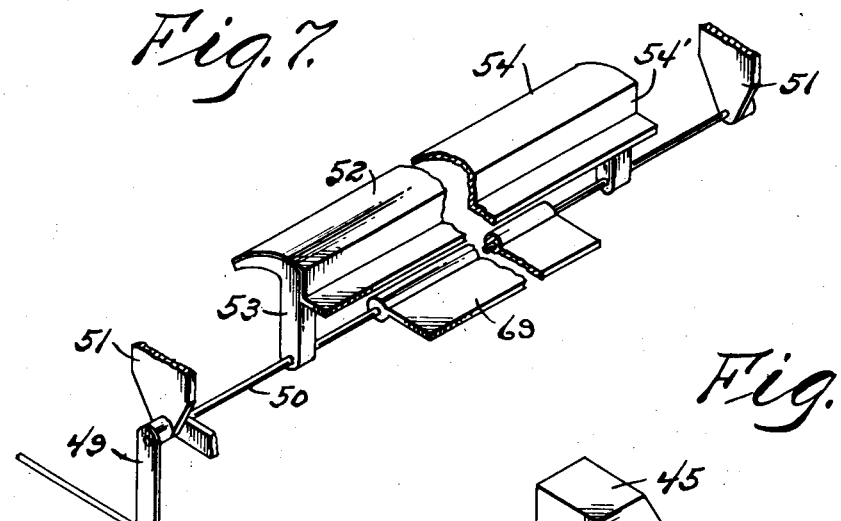
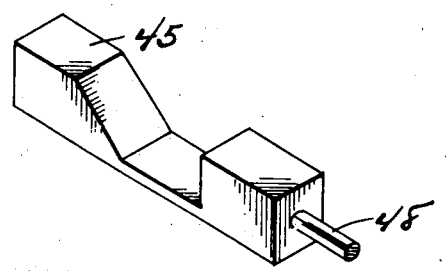
Vander B. Lowder
INVENTOR
BY
ATTORNEY
WITNESS

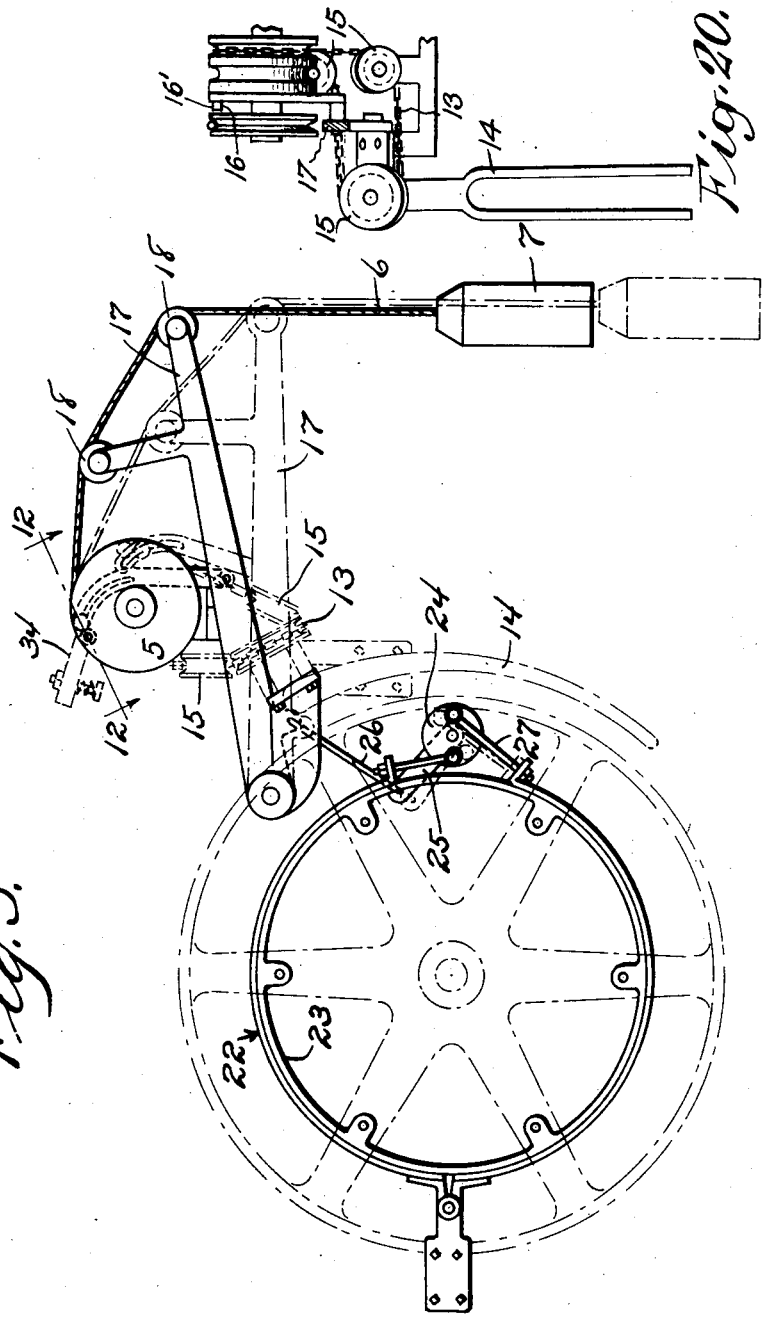

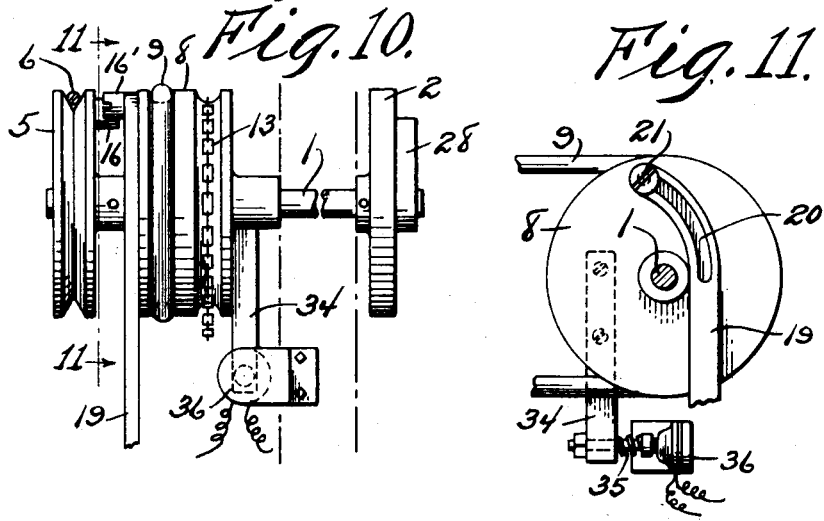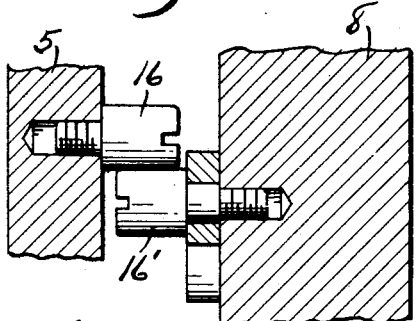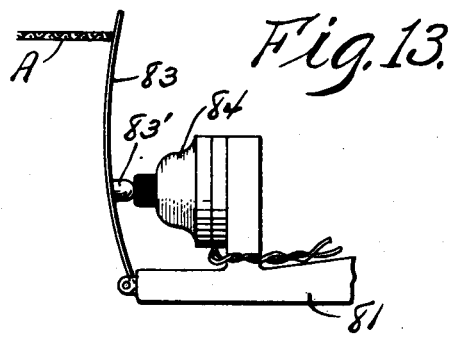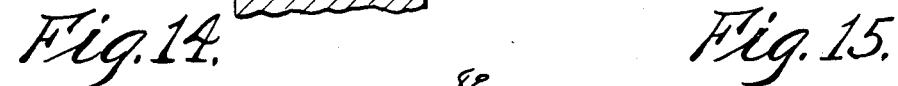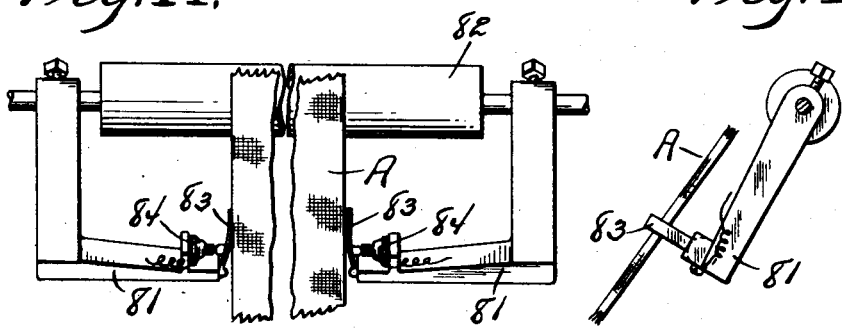

Feb. 26, 1929.
V. B. LOWDER
1,703,774
NAPPING MACHINE STOP
Original Filed April 18, 1925  7 Sheets-Sheet 7
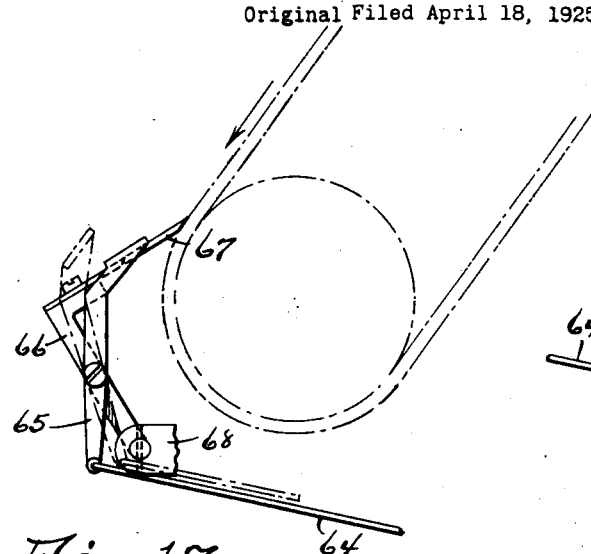
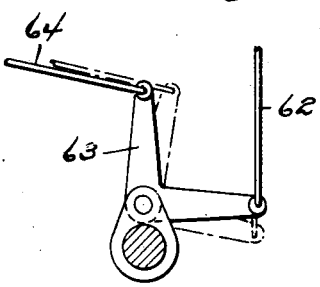
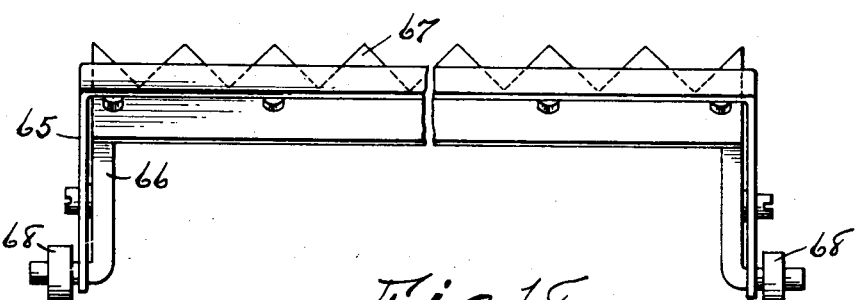
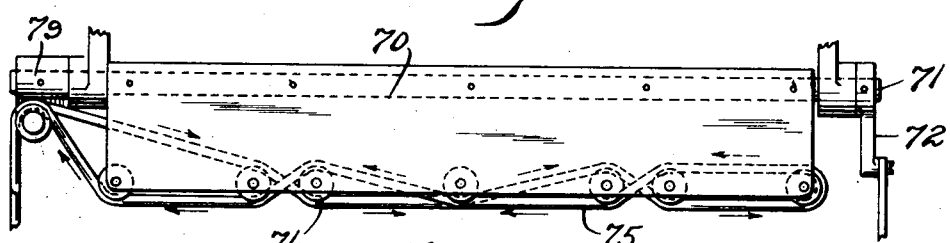
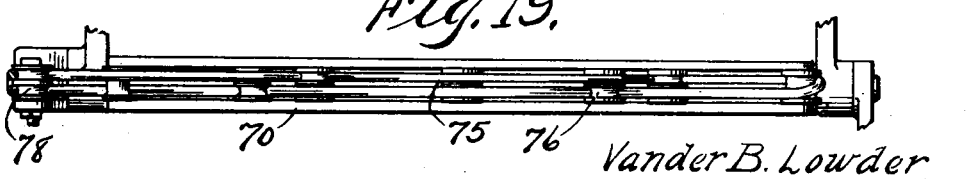
Vander B. Lowder
INVENTOR
BY *Victor J. Evans*
ATTORNEY
WITNESS:

Patented Feb. 26, 1929.

1,703,774

UNITED STATES PATENT OFFICE.

VANDER B. LOWDER, OF CONCORD, NORTH CAROLINA, ASSIGNOR, BY DIRECT AND MESNE ASSIGNMENTS, OF ONE-HALF TO A. G. ODELL, OF CONCORD, NORTH CAROLINA.

NAPPING-MACHINE STOP.

Application filed April 18, 1925, Serial No. 24,178. Renewed December 29, 1928.

This invention relates to improvements in napping machines, the general object of the invention being to provide means whereby the machine will function with the minimum amount of attention on the part of the operator so that one operator can take care of a number of machines and the machine can be kept in operation during the lunch period and other rest periods.

Another object of the invention is to provide means for stopping the machine when an end of the cloth starts to pass through the machine or when holes appear in the cloth.

Another object of the invention is to provide means for stopping the machine and for cutting the cloth when the cloth starts to wrap up on the napping cylinder.

A further object of the invention is to provide means for instantly stopping the machine when such means are operated either automatically or by hand.

A still further object of the invention is to provide means for straightening the cloth as it enters the machine by removing wrinkles and folds therefrom.

Another object of the invention is to provide means for sounding an alarm when the cloth runs over too far towards the ends of the napping rollers.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of one side of a machine provided with my invention.

Figure 2 is a view of the other side of the machine.

Figure 3 is a diagrammatic view of parts of the stopping mechanism.

Figure 4 is a section on line 4—4 of Figure 3.

Figure 5 is a perspective view of the bracket and roller for supporting one of the sliding members.

Figure 6 is perspective view showing a portion of the slotted table and some of the arms for stopping the device.

Figure 7 is a perspective view of another part of the stopping mechanism.

Figure 8 is a perspective view of one of the sliding parts.

Figure 9 is a diagrammatic view of the weight actuated parts and showing the brake on the napping cylinder and the belt shifter.

Figure 10 is a view of the weight actuated shaft and its pulleys and disk.

Figure 11 is a section on line 11—11 of Figure 10.

Figure 12 is a detail sectional view through two of the pulleys, showing the abutments thereon.

Figure 13 is a view of the switch means operated by the cloth passing too far towards the end of the napping rollers.

Figure 14 is a front view of such means.

Figure 15 is an edge view of Figure 14.

Figure 16 is a view of the cutting means.

Figure 17 is a view of the cutting knife and the yoke-shaped member pivoted thereto.

Figure 18 is a plan view of the cloth straightening means.

Figure 19 is an edge view of such means.

Figure 20 is a view showing the belt shifting mechanism.

In these drawings, 1, Figs. 1 and 3, indicates a shaft journaled in the frame of the napping machine and which has secured to one end thereof a disk 2 which has a notch 3 therein for receiving the latch end of a bell crank lever 4 for holding the shaft against movement. Pulley 5 is fastened to the other end of the shaft 1, Figs. 2 and 9 and a cable 6 is fastened to said pulley and engages a portion of the groove therein and is connected to a weight 7 which will give the shaft a partial rotary movement when the latch is withdrawn from the notch in the disk 2. A double pulley 8 is rotatably mounted on the shaft 1 and one groove in said pulley is engaged by a belt 9 which passes over a pulley 10, the shaft 11 of which has a handle 12 attached thereto so that the pulley can be rotated by hand, and this movement will be imparted to the double pulley 8. Chain 13, Figs. 2, 9 and 10, engages the other groove of the double pulley 8 and is connected with the belt shifter 14 of the napping machine in the usual manner, said chain passing over the guiding pulleys 15. The large headed bolts 16 and 16', Figs. 10 and 14 are carried by the pulleys 5 and 8 respectively so that the pulley 8 will be caused to move with the pulley 5 when the said pulley 5 is partially rotated by the weight 7 and said pulley 5 will be returned to normal position, to raise the weight, by the pulley 8 when said pulley 8 is actuated through the manual operation of the pulley 10 and the belt 9. A lever 17 is pivoted to a part of the frame of the apparatus and its outer end carries the guide pulleys 18 for the cable 6. This lever is provided with an upwardly extending arm 19, the slot 20 of which engages the headed bolt 16' in the pulley 8, so that the lever is held in raised position as long as the shaft 1 is held against movement through the weight 7 by the latch 4 engaging the notch in the disk 2, but when the latch is removed from the notch and the shaft is turned by the weight, the downward movement of the pin 21 will permit the weight and gravity, to lower the lever 17, and this downward movement of the lever will tighten the brake band 22, Figs. 2 and 9, on the brake drum 23 of the napping cylinder through means of the disk 24 which has its arm 25 connected with the lever 17 by the link 26, and the connecting links 27 which connect the disk with the ends of the brake band 22.

A cam 28, Figs. 1 and 3, is fastened to the shaft 1, and this cam normally supports in raised position an arm 29 which is connected by a rod 30 with a pawl 31 pivoted to the frame of the apparatus and which is adapted to engage a cog 32 on the shaft 33 of one of the cloth feeding rollers to stop the feeding of the cloth through the machine. When the shaft 1 is moved by the weight, the cam 28 will move from under the arm 29, so that said arm and the pawl will drop by gravity and the pawl will engage the cog and stop the feeding of the cloth.

When the apparatus is operated by an electric motor, an arm 34, Figs. 10 and 11, is fastened to the pulley 8 and carries a spring plunger 35 which is adapted to engage a spring switch 36, when the stopping mechanism is in inactive position, so as to close the circuit of the magnetic switch of the motor to hold the same closed. When the shaft 1 is rotated by the dropping of the weight 7, the arm 34 is lifted so as to move the plunger out of engagement with the switch 36, which will permit the spring of said switch to open the same and thus break the circuit of the motor switch and stop the motor.

From the foregoing it will be seen that when the bell crank 4 is raised, the weight will drop, thus turning the shaft 1, so that the double pulley 8 will be rotated by means of the pins 16 and 16' and the pulley 5, which will cause the chain 13 to shift the belt on to the loose pulley, or moving the plunger 35 on the arm 34 off the switch 36 to stop the motor, and this movement of the pulley 8 will permit the lever 17 to fall, thus applying the brake to the cylinder to stop rotary movement of the same and the cam 28 will move from under arm 29, which will permit the pawl 31 to drop into engagement with the ratchet 32 and thus stop movement of the cloth feeding mechanism. Thus as soon as the latch 4 is moved out of the notch in the disk 2, the machine will be instantly brought to rest.

The latch member 4 is moved to releasing position when a lever 37 Figures 1, 3, and 4 is tilted from its normal position while it is being reciprocated through means of the lever 38, pivoted intermediate its ends, to a bracket 39, and the disk 40, carried by the cylinder shaft and having a cam groove 41 therein which engages a roller 42 on a pin 43 carried by the lever 38. Thus the lever 38 will be rocked by the rotary movement of the disk 40 and the lever 38 will reciprocate the lever 37, to which it is pivoted. The lever 37, in its normal position, will not strike the latch member 4 in its movement but when it is tilted it will strike the latch member and thus move said member out of its notch. The forward end of the lever 37 has a head 44 thereon which is provided with a beveled end and which normally lies in a notch in a sliding block 45 which also has a beveled wall for engaging the beveled end of the head 44. The block is supported by a roller 46 in a bracket 47 and is fastened to a rod 48 which has its other end fastened to an arm 49 secured to an end of a rock shaft 50 which is supported in the hangers 51 carried by the frame of the machine. The engagement of the head 44 in the notch of block 45 will cause said block to reciprocate with the lever 37 and thus the rock shaft 50 will be rocked through the reciprocation of the lever 37. When the block 45 is held against movement, however, the beveled end of head 44 will slide up the beveled wall of block 45, on the rearward movement of the lever 37, which will cause the lever 37 to tilt, as shown in dotted lines in Figure 3 and thus it will strike the member 4 and move said member out of the notch in disk 2. An inverted L-shaped member generally designated by the numeral 52 is supported upon the rock shaft 50 and includes a number of L-shaped members 53 arranged in inverted position with their stems fixed at their outer ends to the shaft 50 and a strip 54 is arranged over and fastened to the outer curved surfaces of the arms of the L-shaped members and which is formed with an angle shaped part 54' to provide a shelf in front of the members 53. The major portion of the strip 54 is curved as shown. A table 55 is supported by the frame of the machine and the cloth, shown at A passes over this table as it enters the machine. The member 52 oscillates directly under the table through the movement of the rock shaft. The table is provided with the slots 56 through which fingers 57 will drop when a hole in the cloth comes over one or more of the slots 56 in the table. These fingers will engage the member 52 and as said member moves rearwardly, the fingers will drop upon the shelf 54 of said member and thus prevent its return movement so that the rock shaft and block 45 will be held against movement, thus causing the lever 37 to be tilted so as to move the latch member 4 to releasing position and so stop the machine. This same action will take place when an end of the cloth starts to pass over the table. The fingers are pivoted to the arms 58 which are fastened to a supporting rod 59 carried by the frame. One of the fingers 57' is out of alignment with the table so that it will not engage the table but this finger will engage the shelf when it is swung downwardly through means of a rod 60, bell crank 61, rod 62, bell crank 63, rod 64 and a yoke-shaped member 65 Fig. 17, which is pivoted to a similar member 66 which carries a knife 67 and which is so arranged that it will cut the cloth when the same starts to travel around on the cylinder, due to portions thereof being caught in the cylinder. When this occurs a portion of the cloth will engage the yoke-shaped member 65 and move the same, which movement will be communicated to the finger 57' through the movement of the rod 64 as shown in Figure 17 to swing the same downwardly, by the connections specified, so that this finger will stop the movement of the member 52 and thus operate to stop the machine. The knife carrying member 66 is supported upon brackets 68 on the frame and is so arranged that should the cloth start to move along with the cylinder or guide roll the cloth will have a tendency to pile up against the cutting knife 16 and move it together with the yoke 65 outwardly as shown in the dotted lines in Fig. 17, actuating the rod 64 and at the same time causing the cloth to be drawn sufficiently tight against the knife 17 to cut the same and thus prevent the cloth from being entangled in the machine. It will also be apparent from the foregoing that the rod 64 will be actuated as stated to stop the machine.

The means for smoothing out the cloth as it enters the machine comprises a wiper strip 69, Figs. 1 and 7, keyed on to the rock shaft 50 for wiping across the front face of the cloth and a combined wiper and straightener device 70 for acting upon the other face of the cloth. The device 70 is fixed to a rock shaft 71 journaled in the frame, the arm 72 of which is connected by a link 73 with an arm 74 on the rock shaft 50 so that the movement of the rock shaft 50 will be communicated to the shaft 71 which will cause the wiper device 70 to oscillate and thus remove loops and wrinkles from the cloth before it enters the machine. The wiper 69, operating on the other face of the cloth, will have the same effect. The cloth is kept straight by the belt 75 which passes over the rollers 76 on the device 70 and over the guide pulleys 78 on the bracket 79 fastened to the shaft 71 and over the power pulley 80. The belt and pulleys are so arranged that the portions of the belt in contact with the cloth move from the center of the cloth towards the edges and thus straighten the cloth. Figures 18 and 19 show a device used with two strips of cloth.

The means for giving an alarm if the cloth runs over too far toward the ends of the napping rollers, comprises a pair of angle-shaped arms 81, Figs. 1, 2, 13, 14 and 15, on the shaft of one of the guiding rolls 82 of the machine, each of which carries a spring strip 83 for engaging the outer edge of the cloth and a push button switch 84, the button of which is engaged by a projection 83' on the strip 83. The switches 84 are arranged in the circuit of an alarm 85 so that when the cloth A moves over too far, it will cause the strip 83 to push in the button of the switch 84 and thus close the circuit to the alarm so that the operator will be warned of the fact that the cloth is moving toward the end of the napping rollers.

From the foregoing it will be seen that this device will act to instantly stop the machine on which it is applied when loose ends or portions of cloth with holes therein start to enter the machine. This will prevent wrap-ups, saves cloth, protects napper clothing and saves the operator's time, thus increasing the production of the machine. In case the cloth tears or wraps up for any cause, the invention cuts the cloth off and automatically stops the machine. The selvage or wrinkle straightening parts keeps the cloth from rolling or curling on the selvage as it enters the machine, thus releasing the operator for other duties. These parts also prevent folds of cloth from doubling up and going into the machine. The alarm will warn the operator when the cloth runs over too far towards the ends of the napping rollers and a machine equipped with this invention needs the minimum amount of attention and can be left running during lunch hour and other rest periods.

It is thought from the foregoing description that the advantages and novel features of my invenion will be readily apparent.

I desire it to be understood that I may make changes in the construction and in the combination and arrangement of the several parts, provided that such changes fall within the scope of the appended claims.

What I claim is:—

1. In a napping machine, means for automatically stopping the machine if a loose end or a part of the cloth with holes therein should enter the machine and means associated with the first mentioned means for cutting the cloth and for stopping the machine if the cloth should start to wrap up on the cylinder.

2. In a napping machine, a weight operated member, means actuated thereby for braking the cylinder of the machine and stopping the feeding of cloth through the machine and disconnecting the machine from its power means, means for holding the member with the weight in raised position and means for moving the holding member to releasing position when a loose end or defect in the cloth enters the machine or when the cloth starts to wrap up on the cylinder.

3. In a napping machine, a weight operated member, means actuated thereby for braking the cylinder of the machine and stopping the feeding of cloth through the machine and disconnecting the machine from its power means, means for holding the member with the weight in raised position and means for moving the holding member to releasing position when a loose end or defect in the cloth enters the machine or when the cloth starts to wrap up on the cylinder and means for cutting the cloth when it starts to wrap up on the cylinder.

4. In a napping machine, a shaft journaled therein, a weight connected with the shaft for rotating the same, a latch member for holding the shaft with the weight in raised position, brake means for the napping cylinder, means associated with the shaft for applying the brakes when the shaft is moved by the weight, means associated with the shaft for releasing the machine from its power means when the shaft is moved by the weight, means associated with the shaft for stopping the feeding of cloth through the machine when the shaft is moved by the weight and means for moving the latch member to releasing position when a loose end or defect appears in the cloth or when the same starts to wrap up on the cylinder.

5. In a napping machine, a shaft journaled therein, a pulley on the shaft, a weight connected with the pulley, latch means for holding the shaft with the weight in raised position, a second pulley on the shaft, means actuated thereby for releasing the machine from its power means when the shaft is rotated by the weight, a lever pivoted to the machine, brake means for the cylinder actuated by the downward movement of the lever, means for connecting the lever with the second pulley, a cam on the shaft, an arm engaging the same, means actuated by the lowering of the arm by the cam for stopping the feeding of the cloth through the machine and means for moving the latch means to releasing position when a loose end or defect appears in the cloth or the cloth starts to wrap up on the cylinder.

6. In a napping machine, a shaft journaled therein, a pulley on the shaft, a weight connected with the pulley, latch means for holding the shaft with the weight in raised position, a second pulley on the shaft, means actuated thereby for releasing the machine from its power means when the shaft is rotated by the weight, a lever pivoted to the machine, brake means for the cylinder actuated by the downward movement of the lever, means for connecting the lever with the second pulley, a cam on the shaft, an arm engaging the same, means actuated by the lowering of the arm by the cam for stopping the feeding of the cloth through the machine, means for moving the latch means to releasing position when a loose end or defect appears in the cloth or the cloth starts to wrap up on the cylinder and means for rotating the shaft by hand to restore the parts to normal position and to raise the weight.

7. In a machine of the class described, weight actuated means for stopping the machine, a latch member for holding said means with the weight in raised position and means for moving the latch member to releasing position when a loose end or a defect in the cloth enters the machine or when the cloth starts to wrap up on the cylinder of the machine, such means including a rocking member, a table over the rocking member and across which the cloth passes, said table having holes therein, pivoted fingers over the holes and resting upon the cloth, said fingers dropping through the holes and engaging the rocking member to stop the same when a loose end or a hole in the cloth passes over the table.

8. In a machine of the class described, a knife for cutting the cloth if the same should start to wrap up on the cylinder of the machine and means for stopping the machine by this wrapping up action of the cloth.

In testimony whereof I affix my signature.

VANDER B. LOWDER.